H. & P. E. BAILEY.
NON-PUNCTURABLE TIRE.
APPLICATION FILED MAY 14, 1914.

1,148,427.  Patented July 27, 1915.

Witnesses
O. H. Cook

Inventors
H. Bailey AND
P. E. Bailey.
By
Attorney

UNITED STATES PATENT OFFICE.

HARRIET BAILEY AND PEARL E. BAILEY, OF HILLSDALE, OREGON.

NON-PUNCTURABLE TIRE.

1,148,427. Specification of Letters Patent. Patented July 27, 1915.

Application filed May 14, 1914. Serial No. 838,533.

*To all whom it may concern:*

Be it known that we, HARRIET BAILEY and PEARL E. BAILEY, citizens of the United States, residing at Hillsdale, in the county of Multnomah and State of Oregon, have invented certain new and useful Improvements in Non-Puncturable Tires; and we do hereby declare the following to be a full, clear, and exact description of the invention, such as will enable others skilled in the art to which it appertains to make and use the same.

This invention relates to non-puncturable tires, and one of the principal objects of the invention is to provide a tire composed of an inflatable inner tube and a series of spirally wound rubber protectors for said tube, said protectors having intermediately wound rubber strips, and said protector being formed of rubber to thus provide a tire which will yield and at the same time cannot be punctured by means of an ordinary piece of glass or a tack or other projections.

Another object of the invention is to provide a pneumatic tube having a protector surrounding the same, said protector comprising a hollow strip or strips firm and heavy enough to withstand weight of a machine without collapsing, having a rounded outer surface and a curved inner surface to lie flat against the pneumatic inner tire, and rubber strips to fit the grooves or spaces between the layers of the protector.

Figure 1:
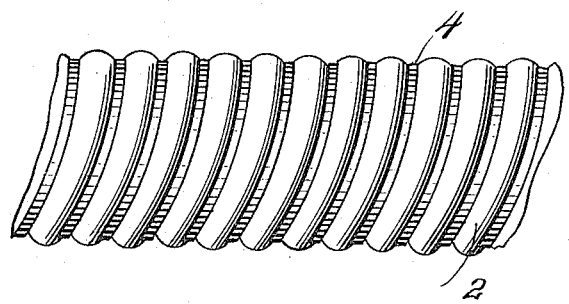
Figure 2:
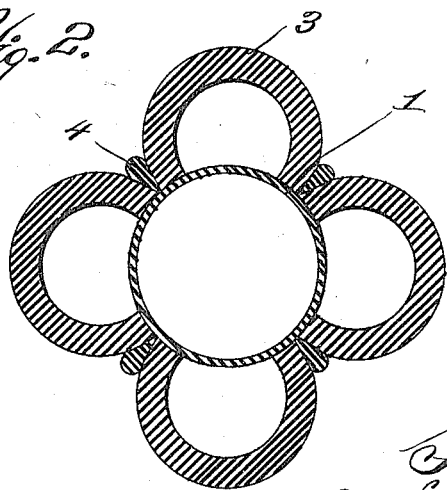
Figure 3:
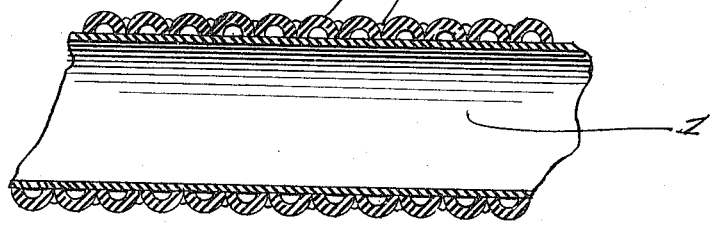

These and other objects may be attained by means of the construction illustrated in the accompanying drawing, in which, Figure 1 is a side elevation of a non-puncturable tire made in accordance with this invention, Fig. 2 is a sectional view of the same, taken transversely of the tire, with the coils enlarged, and Fig. 3 is a longitudinal section of a portion of the tire.

Referring to the drawing, the numeral 1 designates an inflatable inner rubber tube, which may be of the usual or any suitable construction and thickness. Wound spirally around the inflatable tube 1 is a strip or strips of rubber forming spiral coils 2 lying closely together. The strip of rubber is provided with a curved outer side 3 and the inner side is formed to lie flat against the outer surface of the inner inflatable tube 1. When the protector strip 3 has been wound about the tube 1, the grooves between the strips are filled by means of a V-shaped strip of solid rubber 4, having rounded outer edges, said strip being placed in the groove and wound tightly therein to hold the parts in place and to form a complete cover for the inner tube 1.

A non-puncturable tire made in accordance with this invention can be manufactured at comparatively low cost and is reliable and efficient for its purpose. An ordinary projection such as would be met with by an automobile or other vehicle wheel would not reach through the thick rubber protector 3, and if it should happen that the obstruction met with should be disposed between the rubber strips or members 3 and come in contact with the strip of rubber 4, there would be no pressure from the outside to push the obstruction in and puncture the tube 1, and if the projection should be longer than the protector is high, it would hit the rounded top of 4 and glance off to 3.

Various changes may be made in the details of construction without departing from the spirit and scope of the invention as defined in the claim.

What is claimed is:—

A non-puncturable tire comprising an inner inflatable tube, a plurality of hollow rubber strips wound spirally around said tube, said strip having a rounded outer surface and curved inner surfaces to conform to the contour of the tube, and a solid rubber strip substantially V-shaped wound between the spiral coils and the hollow strips completely covering the inner inflatable tube.

In testimony whereof we affix our signatures in presence of two witnesses.

HARRIET BAILEY.
    PEARL E. BAILEY.

Witnesses:
 ERNESTINE MCRAE,
 T. H. WARD.